United States Patent
Shi et al.

(10) Patent No.: US 11,411,221 B2
(45) Date of Patent: Aug. 9, 2022

(54) BINDERS FOR SILICON ELECTRODES IN LITHIUM-ION BATTERIES

(71) Applicant: UCHICAGO ARGONNE, LLC, Chicago, IL (US)

(72) Inventors: Zhangxing Shi, Chicago, IL (US); Lu Zhang, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 185 days.

(21) Appl. No.: 16/791,651

(22) Filed: Feb. 14, 2020

(65) Prior Publication Data

US 2021/0257620 A1  Aug. 19, 2021

(51) Int. Cl.
| | |
|---|---|
| H01M 4/133 | (2010.01) |
| H01M 4/587 | (2010.01) |
| H01M 4/583 | (2010.01) |
| H01M 4/1393 | (2010.01) |
| H01M 4/134 | (2010.01) |
| H01M 4/1395 | (2010.01) |
| H01M 4/62 | (2006.01) |
| H01M 4/38 | (2006.01) |
| H01M 10/0525 | (2010.01) |
| H01M 4/04 | (2006.01) |
| H01M 4/36 | (2006.01) |
| H01M 50/20 | (2021.01) |
| H01M 4/02 | (2006.01) |

(52) U.S. Cl.
CPC ......... *H01M 4/622* (2013.01); *H01M 4/0404* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/386* (2013.01); *H01M 4/587* (2013.01); *H01M 4/625* (2013.01); *H01M 10/0525* (2013.01); *H01M 50/20* (2021.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 2009/0136845 | A1* | 5/2009 | Choi | H01M 4/0404 429/212 |
| 2016/0064737 | A1* | 3/2016 | Ogawa | H01M 4/622 429/162 |
| 2018/0175366 | A1* | 6/2018 | Zheng | H01M 4/1395 |
| 2019/0058196 | A1* | 2/2019 | Kurihara | H01M 4/364 |

(Continued)

OTHER PUBLICATIONS

Arora, P. et al., Battery Separators, Chemical Review 104, 4419-4462 (2004).

(Continued)

*Primary Examiner* — Yoshitoshi Takeuchi
(74) *Attorney, Agent, or Firm* — Olson & Cepuritis, Ltd.

(57) ABSTRACT

An electrode for a lithium-ion electrochemical cell comprises silicon particles and carbon particles coated on a conductive current collector. The silicon and carbon particles being bound to each other and to the current collector by a cross-linked binder formed from a combination of a poly(carboxylic acid) such as poly(acrylic acid) and a branched polyethyleneimine. A method of preparing the anode also is described.

19 Claims, 5 Drawing Sheets

(56) References Cited

U.S. PATENT DOCUMENTS

2019/0319269 A1* 10/2019 Saito .................. H01M 4/525
2020/0321655 A1   10/2020 Vaughey et al.

OTHER PUBLICATIONS

Han, Z-J et al., Electrochemical Lithiation Performance And Characterization of Silicon-Graphite Composites With Lithium, Sodium, Potassium, and Ammonium Polyacrylate Binders, Phys. Chem. Chem. Phys. 17, 3783-3795 (2015).
Jow et al., (Eds.) Electrolytes For Lithium and Lithium-Ion Batteries; Chapter 3, pp. 167-182; Springer; New York, NY (2014).

* cited by examiner

BINDERS FOR SILICON ELECTRODES IN LITHIUM-ION BATTERIES

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

This invention relates to lithium electrochemical cells and batteries with a silicon-based electrode. In particular this application relates to binders for silicon-based electrodes (e.g., anodes) in lithium battery systems.

BACKGROUND

The rapid development of electric vehicles (EVs), plug-in hybrid electric vehicles (HEVs), and portable electronic devices has created a high demand for next-generation lithium-ion batteries with higher specific capacities and higher efficiencies. One way to increase the energy density of a full electrochemical cell is to improve the anode capacity. The commercial anode materials currently used, notably graphite, have excellent stability and properties, however, their relatively low capacity has become a limiting factor in next-generation cell development. Partially or fully replacing the traditional graphite anode by silicon (Si) has been an area of interest for several years, since silicon is abundant, low-cost, and has a theoretical capacity (about 3640 mAh/g) approximately 10 times higher than graphite (about 370 mAh/g).

In practice, the beneficial attributes of Si are offset by issues associated with the large volume expansion that occurs with the reversible formation of various lithium silicides (LS) and the reactivity of the lithiated Si electrode with highly charged $Si_2^{-2}$ and/or $Si^{-4}$ anions, which reduce the binders and electrolyte components. Together these processes combine to reduce the amount of active lithium, reduce free electrolyte solvents, break binder-surface interactions, and contaminate interfacial surfaces with various impurity phases, resulting in low cycling efficiencies and an unstable solid electrolyte interphase (SEI).

One of the main reported ways to stabilize Si anodes has been to use anode binders that are more compatible and flexible than the polyvinylidene difluoride (PVDF) binders traditionally used with graphite anodes, for example, using alginic acid, carboxymethyl cellulose (CMC), poly(acrylic acid) (PAA), poly(vinyl alcohol) (PVA), or lithium polyacrylate (PAA-Li) as a binder in place of PVDF. These binders also have problems of their own, however.

Another approach has been to use a cross-linked binder. For example, binders that are formed from a cross-linked vinyl polymer precursor which polymerizes during lamination have been examined, but involve an elaborate manufacturing process and do not perform well as binders. Binders formed by crosslinking a CMC with a cross-linking polyether epoxide, have been considered, as well, but such "small molecule" cross-linkers are not very efficient.

There is an ongoing need for new binder materials for silicon electrodes in lithium-ion batteries. The binders, electrodes and electrochemical cells described herein address this need.

SUMMARY

Partially or fully replacing a traditional graphite (C) anode by a silicon (Si) anode can greatly improve the energy density of lithium-ion batteries. However, during charging, Si undergoes a large volume expansion as lithium alloys into the silicon and highly reactive lithium silicides form, resulting in continuous consumption of lithium and of electrolyte, as well as fast decay of the anode. In order to ameliorate this problem, a new binder was developed, which is described herein, which allows expansion of the silicon while maintaining greater structural integrity of the anode compared to anodes of similar silicon content utilizing conventional binders.

The cross-linked binder described herein is formed from a combination of a poly(carboxylic acid), such as poly(acrylic acid), and a branched polyethyleneimine (PEI), which is a polymer comprising numerous amino substituents. The amino substituents of the branched polyethyleneimine interact with carboxylic acid groups of the poly(carboxylic acid) such as poly(acrylic acid) (PAA) to form ionic bonds (i.e., salts) and/or covalent bonds (e.g., amides). Since the polyethyleneimine is branched, the resulting binder is cross-linked, which provides better binding integrity compared to conventional linear or branched binders.

One cannot simply mix a poly(carboxylic acid) with a branched polyethyleneimine to form the binder, since this results in an immediate precipitate. A precipitate formed in this manner is not suitable as a binder for the silicon and carbon particles, since it will not evenly mix with the particles after forming. In order to produce a usable binder, a solution is formed, which comprises the branched polyethyleneimine and an ammonium salt of the poly(carboxylic acid) (e.g., ammonium polyacrylate). The silicon and carbon particles are dispersed in this solution to form a slurry. Next, the slurry is coated onto a current collector (e.g., carbon or a metal such as copper) to form an anode precursor. The anode precursor is then heated under vacuum (e.g., about 10 to 60 Torr), which drives of both solvent (e.g., water) and ammonia from the solution and forms the cross-linked binder by ionic and/or covalent bonds between amino groups of the polyethyleneimine and carboxylic acid groups of the poly(carboxylic acid).

Silicon-containing electrodes formed as described herein are mechanically robust anodes for lithium-ion batteries. When dissolved in water the ammonium poly(carboxylic acid)-PEI solutions have comparable viscosity to lithium PAA solutions, and are suitable for standard electrode lamination procedures. Only a relatively small amount of PEI relative to the poly(carboxylic acid), e.g., PAA, is required to achieve a suitable level of cross-linking (e.g., about 0.2 to about 1 wt % of PEI relative to PAA). Surprisingly, silicon electrodes fabricated using in situ cross-linked PAA-PEI as binder show improved performance in full cells relative to other binder systems such as lithium polyacrylate (PAA-Li).

The following non-limiting embodiments are provided to illustrate certain aspects and features of the electrodes, electrochemical cells, batteries and methods described herein.

Embodiment 1 is an electrode for a lithium-ion electrochemical cell comprising silicon particles and carbon particles coated on a conductive current collector; wherein the silicon particles and carbon particles are bound to each other and to the current collector by a cross-linked binder formed from a combination of a poly(carboxylic acid) and a branched polyethyleneimine.

Embodiment 2 comprises the electrode of embodiment 1, wherein the poly(carboxylic acid) comprises poly(acrylic acid).

Embodiment 3 comprises the electrode of embodiment 1 or 2, wherein the poly(carboxylic acid) and the branched polyethyleneimine are present in the combination in a respective weight ratio of about 3:1 to about 20:1.

Embodiment 4 comprises the electrode of any one of embodiments 1 to 3, wherein the cross-linked binder is formed in situ during manufacture of the electrode by heating a mixture of the silicon particles, the carbon particles, and a binder precursor solution comprising a poly(carboxylic acid) ammonium salt and the branched polyethyleneimine, to thereby drive off ammonia and solvent from the binder precursor solution and form the cross-linked binder.

Embodiment 5 comprises the electrode of any one of embodiments 1 to 4, wherein the poly(carboxylic acid) ammonium salt and the branched polyethyleneimine are present in the binder precursor solution in a respective weight ratio of about 4:1 to about 25:1.

Embodiment 6 comprises the electrode of any one of embodiments 1 to 5, wherein the mixture of the silicon particles, the carbon particles, and the binder precursor solution is heated at a temperature in the range of about 80 to about 150° C. for about 8 to about 12 hours under vacuum.

Embodiment 7 comprises the electrode of any one of embodiments 1 to 6, wherein the silicon particles and the carbon particles are coated on the current collector in a respective weight ratio of about 3:1 to about 10:1.

Embodiment 8 comprises the electrode of any one of embodiments 1 to 7, wherein the silicon particles and the carbon particles are coated on the current collector at a loading of about 2 to about 20 grams per square meter.

Embodiment 9 comprises the electrode of any one of embodiments 1 to 8, wherein the current collector comprises conductive carbon or a metal selected from the group consisting of copper, nickel, copper alloy, and nickel alloy.

Embodiment 10 comprises the electrode of any one of embodiments 1 to 9, wherein the carbon particles comprise at least one material selected from the group consisting of carbon black, graphite, carbon nanotubes, carbon nanofibers, and graphene.

Embodiment 11 comprises the electrode of any one of embodiments 1 to 10, wherein the carbon particles comprise conductive carbon black.

Embodiment 12 is a method of manufacturing a silicon-containing electrode of any one of claims 1 to 11 comprising:

(a) coating a slurry comprising silicon particles and carbon particles dispersed in a binder precursor solution onto a conductive current collector to form an electrode precursor; wherein the binder precursor solution comprises a poly(carboxylic acid) ammonium salt and a branched polyethyleneimine;

(b) heating the electrode precursor at a temperature in the range of about 80 to about 150° C. for about 8 to about 12 hours under vacuum to drive off ammonia and solvent from the binder precursor solution to thereby form a cross-linked binder in situ and to bind the silicon particles and carbon particles onto the current collector;

(c) releasing the vacuum; and (d) recovering the electrode.

Embodiment 13 is a lithium electrochemical cell comprising an anode, a cathode, a lithium ion-conducting separator between the anode and the cathode, and a lithium ion-containing electrolyte contacting the anode, the cathode, and the separator; wherein the anode is the electrode of any one of claims 1 to 11.

Embodiment 14 is a battery comprising a plurality of electrochemical cells of embodiment 13 electrically connected together in series, in parallel, or in both series and parallel.

DETAILED DESCRIPTION

Figure 1:
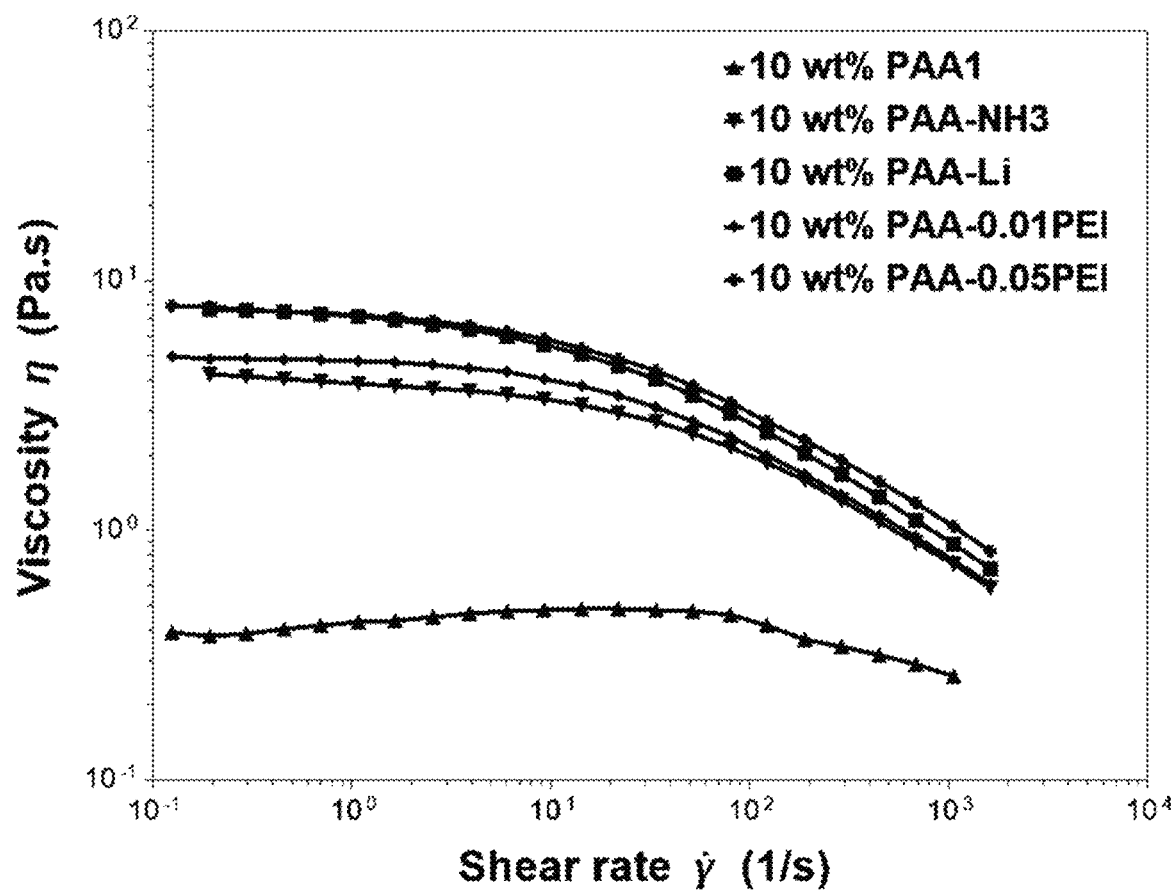
FIG. 1 provides plots of apparent viscosity versus shear rate for slurries of silicon and carbon particles in an aqueous solution comprising various binder materials.

As described herein, an electrode for a lithium-ion electrochemical cell comprises silicon particles and carbon particles coated on a conductive current collector. The silicon and carbon particles being bound to each other and to the current collector by a cross-linked binder formed from a combination of a poly(carboxylic acid) such as poly(acrylic acid) and a branched polyethyleneimine. A method of preparing the anode also is described.

The binder comprises a poly(carboxylic acid) component and a branched polyethyleneimine component, that is cross-linked by ionic bonds, covalent amide bonds, or a combination thereof between the carboxylic acid groups of the poly(carboxylic acid) and amino groups (primary, secondary and/or tertiary amino groups) of the branched polyethyleneimine.

Branched polyethyleneimine (also known as poly(iminoethylene) is a polymer comprising secondary amino ($CH_2CH_2$—NH) monomer units, tertiary amino ($CH_2CH_2$—N) monomer units in a branched structure with terminal —NH2 groups at the ends of the branches. The branched polyethyleneimine (PEI) preferably has a weight average molecular weight ($M_w$), as determined by gel permeation chromatography (GPC), in the range of about 600 to about 100,000 Daltons (preferably about 1,000 to about 50,000 Daltons, for example, about 10,000 Daltons).

The poly(carboxylic acid) component can be any soluble poly(carboxylic acid), such as poly(acrylic acid) (PAA), alginic acid, carboxymethylcellulose (CMC), poly(aspartic acid) (PAsp), poly(glutamic acid) (PGlu), copolymers comprising poly(acrylic acid) chains, and the like. A preferred poly(carboxylic acid) is poly(acrylic acid). The poly(carboxylic acid) can have a $M_n$, as determined by GPC, in the range of about 1000 to about 450,000 Daltons (preferably about 50,000 to about 450,000 Daltons, e.g., about 130,000 Daltons).

Cross-linking of the poly(carboxylic acid) and the polyethyleneimine cannot practically be achieved by simple mixing of the two materials, since this results in an immediate, intractable precipitate. In order to achieve a proper slurry for coating the current collector (e.g., a carbon substrate or a metal such as copper, nickel, or their alloys, cross-linking must be delayed. This can be achieved by utilizing an ammonium salt of the poly(carboxylic acid), which is compatible with the polyethyleneimine in solution (e.g., aqueous solution), such that it does not precipitate. After the silicon, carbon and binder slurry is coated on the current collector, cross-linking is achieved during drying of the electrode, by heating (e.g., as 80 to 130° C.) under vacuum (e.g., about 10 to about 60 Torr), which drives off solvent as well as ammonia, thus allowing cross-linking to occur in situ.

Ionic cross-linking is illustrated in Scheme 1 for PAA and PEI. The reaction shown in Scheme 1, as noted above, must be implemented in situ, since merely mixing the PAA and PEI results in an intractable precipitate. The in situ reaction is achieved by mixing a poly(carboxylic acid-ammonium salt, such as ammonium polyacrylate (PAA-NH3) with the PEI, which does not result in precipitation, and then cross-linking the mixture by driving off ammonia with heat and vacuum which can result in ionic cross-linking, covalent cross-linking by amide bond formation, or a combination thereof, as in Scheme 2.

Scheme 1.

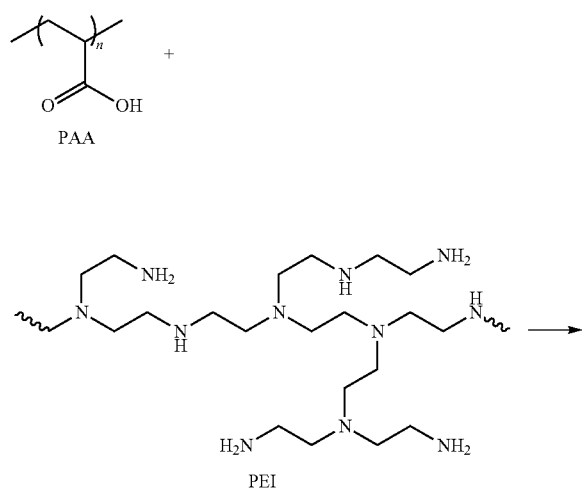

PAA

PEI

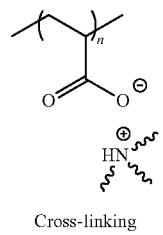

Cross-linking

Scheme 2.

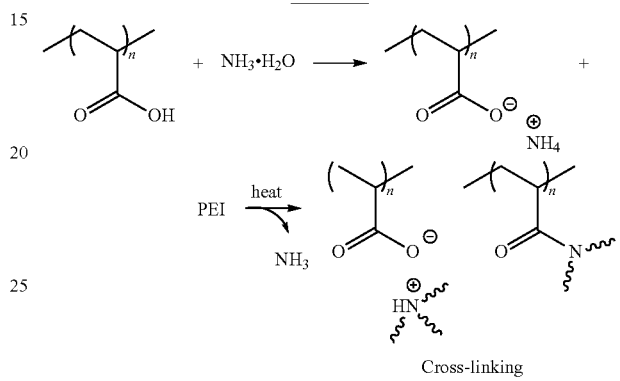

Cross-linking

The electrode also includes silicon and carbon particles. Preferably, the silicon particles have an average size in the range of about 50 to about 200 nm, more preferably about 70 to about 150 nm. The carbon particles can be carbon microparticles or nanoparticles. Non-limiting examples of carbon materials include, e.g., carbon black, graphite, carbon nanotubes, carbon nanofibers, and graphene. Preferably, the electrode includes a the silicon and carbon particles in a respective weight ratio (Si:C) of 3:1 to about 10:1, more preferably about 6:1 to about 8:1. The binder typically comprises about 5 to about 25 wt %, preferably about 10 to about 20 wt %, of the material coated on the current collector, based on the combined weight of the silicon, carbon and binder in the finished electrode (i.e., after drying and cross-linking). The loading of silicon and carbon particles and binder on the current collector typically is in the range of about 0.2 to about 2 mg/cm$^2$, preferably about 0.5 to about 1.3 mg/cm$^2$.

The electrolytes described herein comprise an electrolyte salt dissolved in any non-aqueous organic solvent that can be utilized in a lithium electrochemical cell. Non-limiting examples of such solvents include, e.g., one or more solvent selected from an ether, an ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme, diglyme or triglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate (e.g., FEC), a fluoro-substituted sulfolane, and a fluoro-substituted sulfone. The solvent can comprise a single solvent compound or a mixture of two or more solvent compounds. Preferred solvents include, e.g., oxyethylene ethers (e.g., glyme, diglyme, triglyme and tetraglyme), organic carbonates (e.g., any organic carbonate, preferably other than ethylene carbonate, such as EMC), or mixtures thereof.

The electrolyte salt can include any desired lithium salt that is compatible with a lithium electrochemical cell during electrochemical cycling (i.e., charging and discharging). Non-limiting examples of primary lithium salts useful in the electrolyte compositions described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro (oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium hexafluoroarsenate (LiAsF$_6$), lithium nitrate, combinations of two or more thereof, and the like.

In some preferred embodiments, the lithium salt is LiPF$_6$. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between a Si anode and a cathode, and includes so-called full cells with a Si anode material, as well as so-called half-cells. In some embodiments, the lithium salt is present in the electrolyte at a concentration in the range of about 0.1 M to about 3 M, e.g., about 0.5 M to 2 M, or 1 M to 1.5M.

The electrolyte compositions described herein also can optionally comprise an additional additive such as those described in Jow et al. (Eds.), *Electrolytes for Lithium and Lithium-ion Batteries*; Chapter 3, pp. 167-182; Springer; New York, N.Y. (2014), which is incorporated herein by reference in its entirety. Such additives can provide, e.g., benefits such as SEI, cathode protection, Li salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additional additive is present in the electrolyte at a concentration in the range of about 0.001 M to about 0.25 M, or about 0.01 M to 0.1 M. A preferred additional additive is monofluoroethylene carbonate (FEC; also referred to herein as fluoroethylene carbonate), which preferably is utilized at a concentration in the range of 0.001 to about 12M, e.g., about 0.5 to about 2.5 M.

Optionally, the electrolytes for an electrochemical cell described herein can include an added metal (M) salt, e.g., a Mg, Al, Ca, Sr, Sc, Y, Ga, salt or mixtures of such salts (at a concentration of about 0.001 to about 5 M), to promote in situ formation of amorphous Li-M-Si ternary phases in silicon anodes during the charging process, as described in co-pending, co-owned application Ser. No. 16/375,431 to John T. Vaughey et al., filed on Apr. 4, 2019, which is incorporated herein by reference in its entirety. The metal, M, is selected so to avoid anodic or cathodic activity other than insertion into Si to form ternary Zintl phases. These ternary phases, presumably forming initially on the surface of the anode particles, protect the underlying lithiated Si phases, reduce side reactions with the electrolyte, and limit the effect of large volume changes by reacting with freshly exposed surfaces. Examples of such salts include, e.g., Mg(TFSI)$_2$, Zn(TFSI)$_2$, Ca(TFSI)$_2$, Al(TFSI)$_3$, where TFSI stands for bis(trifluoromethanesulfonyl)imidate.

The silicon-based electrodes described herein can be incorporated in a lithium-ion electrochemical cell comprising a positive electrode (cathode), the silicon-based electrode as an anode, and an ion-conductive separator between the cathode and anode, with the electrolyte in contact with both the anode and cathode, as is well known in the battery art. A battery can be formed by electrically connecting two or more such electrochemical cells in series, parallel, or a combination of series and parallel. The silicon-based anode can be utilized with any cathode or electrolyte compositions useful in lithium-ion batteries. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

The separator component of the lithium-ion cell can be any separator used in the lithium battery art. A typical material is a porous polyalkylene material such as microporous polypropylene, microporous polyethylene, a microporous propylene-ethylene copolymer, or a combination thereof, e.g., a separator with layers of different polyalkylenes; a poly(vinylidene-difluoride)-polyacrylonitrile graft copolymer microporous separator; and the like. Examples of suitable separators are described in Arora et al., *Chem. Rev.* 2004, 104, 4419-4462, which is incorporated herein by reference in its entirety.

Processes used for manufacturing lithium cells and batteries are well known in the art. The active electrode materials are coated on both sides of current collectors (typically copper for the anode and aluminum for the cathode). The cathodes can utilize binders such as polyvinylidene difluoride, carboxymethylcellulose, poly(acrylic acid), or lithium polyacrylate, and the like, to aid in adhering cathode active materials to the current collectors. The cross-linked binders described herein are utilized as the binders for the anodes described herein, but can be used for the cathode, as well.

The cathode active material typically is a lithium metal oxide material. Cell assembly typically is carried out on automated equipment. The first stage in the assembly process is to sandwich a separator between the anode and the cathode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed the cell can be subjected to one or more controlled charge/discharge cycles to activate the electrode materials. This is known as formation cycling. The formation cycling process is well known in the battery art and involves initially charging with a low voltage (or low current) (e.g., substantially lower than the full-cell voltage) and gradually building up the voltage.

In some embodiments, the cathode can comprise a layered lithium metal oxide cathode material such as $LiMO_2$ wherein M=Mn, Ni, Co or a combination thereof (e.g., layered $LiCoO_2$, a layered lithium nickel-manganese-cobalt oxide, often referred to as "NMC", such as $Ni_{0.5}Mn_{0.3}CO_{0.2}O_2$ (also known as "NMC 532"), $Ni_{0.6}Mn_{0.2}CO_{0.2}O_2$ (also known as "NMC 622"), and similar materials). In other embodiments, the cathode can comprise a spinel lithium metal oxide such as $Li_2M'_2O_4$ wherein M'=Mn, Ni, Co or a combination thereof; a structurally integrated 'layered-layered' (LL) lithium metal oxide such as $xLi_2MnO_3.(1-x)LiMn_yM_{1-y}O_2$ wherein $0<x<1$, $0 \le y \le 1$, M=Ni, Co, or Ni and Co; a structurally integrated 'layered-spinel' (LS) lithium metal oxide such as $xLi_2MnO_3.(1-x)Li_2Mn_yM_{2-y}O_4$ wherein $0<x<1$, $0 \le y \le 2$, M=Ni, Co, or Ni and Co; a structurally integrated 'layered-layered-spinel' (LLS) lithium metal oxide such as $z[xLi_2MnO_3.Li_2Mn_yM_{2-y}O_4].(1-z)Li_2M'_2O_4$ wherein $0<x<1$, $0 \le y \le 1$, $0<z<1$, M=Ni, Co, or Ni and Co, and M'=Mn, Ni, Co or a combination thereof (e.g., $0.85[0.25Li_2MnO_3.(0.75)LiMn_{0.375}Ni_{0.375}Co_{0.25}O_2].0.15Li_2M'_2O_4$ wherein M'=a combination of Mn, Ni, and Co); or any other cathode active material used in lithium-ion batteries.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

The following non-limiting Examples are provided to illustrate certain features and aspects of the compositions and methods described herein.

Ex. 1. Silicon Electrode Preparation

Silicon-containing electrodes ("Si electrodes") were prepared by coating Cu foil (as the current collector) with a slurry containing 70 wt % commercial silicon powders from PARACLETE, 10 wt % hard carbon additive (TIMCAL C-NERGY SUPER C45 carbon black additive; "C45 carbon black"), and 20 wt % binder (PAA, PAA-Li) or binder precursor comprising ammonium-PAA and 0.5 wt %, 1 wt %, 2 wt %, or 5 wt % PEI (based on the weight of PAA), mixed in water solvent, at a solids concentration of about 15 to 25 wt % (based on combined weight of silicon, carbon and binder or binder precursor). The resulting electrode precursors were then dried in vacuo (at about 50 Torr) at about 130° C.) for about 12 hours to form the Si electrodes. The Si electrodes had a final loading of about 0.6 to 1.2 mg/cm² of the silicon, carbon, and binder, and a thickness of about 15 μm (not including the Cu foil) after drying.

Ex. 2. Viscometry

Solutions comprising 10 wt % of binders (PAA, ammonium PAA (PAA-NH3), and lithium PAA (PAA-Li)), and binder precursors (PAA-NH3 with 1 wt % or 5 wt % PEI (based on the PAA-NH3 weight)) in water were prepared. The apparent viscosity (in Pa·S) of each solution was measured at 25° C. using a TA Instruments rheometer (Model TA AR 2000ex) equipped with a cone-plate geometry as a function of shear rate ($s^{-1}$).

FIG. 1 provides plots of apparent viscosity versus shear rate for aqueous solutions comprising various binder or binder precursor materials. As can be seen in FIG. 1, aqueous solutions of binder precursor materials show high viscosity at low shear rate and shear thinning at high shear rate. The high viscosity provides desired dispersion of silicon/carbon particles and improves the stability of the slurry. The shear thinning effect helps form a well-dispersed slurry when using a centrifugal mixer.

Ex. 3. Electrochemical Testing

Coin cells (2032-type) were used to test the electrochemical performance. Several different electrodes were used in this work for half-cell and full-cell tests, which were prepared by Argonne's Cell Analysis, Modeling and Prototyping (CAMP) Facility. Preparation of the Si electrodes is described in Ex. 1. Lithium nickel-manganese-cobalt (NMC) oxide cathodes (NMC 622) were prepared, which comprised 90 wt % $LiNi_{0.6}Mn_{0.2}Co_{0.2}O_2$ from Targray, 5 wt % C45 carbon black, and 5 wt % polyvinylidene difluoride (PVDF) binder on an aluminum foil current collector, with a loading of about 9.5 mg/cm² and a thickness of about 36 μm (not including the Al foil). In half-cell tests, the negative electrodes were Li metal chips and the positive electrodes were the Si-containing electrodes, while in the full-cell tests, the negative electrodes were Si anodes with the targeting capacity of about 1.7 mAh/cm², and the positive electrodes were NMC 622 cathodes with the targeting capacity of about 1.5 mAh/cm². The separators for the cells were CELGARD-2320 trilayer polypropylene-polyethylene-polypropylene membranes (20 μm thickness).

The typical half-cell Si-anode testing protocol involves 3 formation cycles, for complete break-in of all crystalline silicon in the electrode, followed by 100 aging cycles at C/3 rate for the half cells. The formation cycles consist of a constant current discharge step at a rate of C/20 until 0.01 V lower cutoff voltage was reached, where the rate "C" is the current applied to fully charge or discharge the silicon content to the theoretical capacity in one hour. Then the cell is charged to 1.5 V at a rate of C/20 to complete one cycle. After 3 formation cycles, aging cycles begin with similar discharge and charge steps between 0.01 and 1.5 V, but at a faster rate of C/3.

The typical full-cell testing protocol involves 3 formation cycles followed by hybrid pulse-power capability cycles (HPPC) and aging cycles followed by another HPPC cycles and 3 formation cycles. The formation cycles consist of constant current charge steps at C/20 (with C being the rate to fully charge the Li content of the cell to the theoretical capacity in one hour) until an upper cutoff voltage of 4.1, 4.2, or 4.5 V. Then the cell is discharged to 3.0 V at a rate of C/20 to complete one cycle. After 3 formation cycles, aging cycles begin with similar charge steps and discharge steps between 4.2 V and 3.0 V, again with a faster rate of C/3. Hybrid pulse-power capability (HPPC) cycles (not shown in data plots in the drawings) with discharge/charge pulses at the rate of 2 C/1.5 C for 10 s are used to investigate the impedance change during full-cell electrochemical tests. The HPPC cycles are inserted after 3 formation cycles and after 92 aging cycles. The discharge area specific impedance (ASI) are calculated as ASI=ΔV/ΔI, where ΔV and ΔI are the voltage and current change during the discharge pulse, respectively. For extended-cycling full cell studies up to 270 aging cycles, 2 cells each were resumed to undergo additional aging cycles described above following the second (2nd) HPPC cycle set.

Ex. 4. Electrode Evaluations and Results

Figure 2:
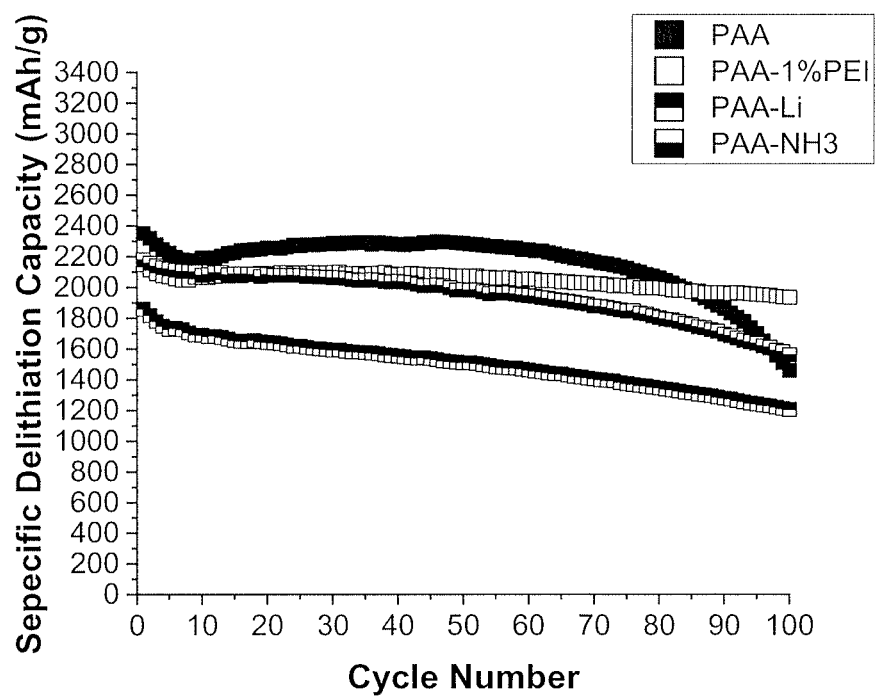
FIG. 2 provides plots of specific delithiation capacity versus cycle number for lithium half cells in 2032 coin-cell format comprising a lithium electrode and various silicon/carbon containing electrodes utilizing different binders.

FIG. 2 provides plots of specific delithiation capacity versus cycle number for lithium half cells in 2032 coin-cell format comprising a lithium electrode and various silicon/carbon containing electrodes utilizing different binders. Each half cell included a lithium electrode and an electrode comprising 70 wt % silicon, 20 wt % binder, and 10 wt % carbon (after drying) (See Ex. 1). The binders tested included PAA, PAA-1% PEI, PAA-Li and PAA-NH3. The results in FIG. 2 show that PAA-1% PEI cells have the best overall cycling performance among the tested binders. PAA-Li cells have the lowest initial capacity and capacity retention of 64% after 100 aging cycles. The initial capacities of PAA, PAA-1% PEI, and PAA-NH3 cells are similar, but the capacity retention of PAA-1% PEI cells after 100 aging cycles (90%) is significantly higher than that of PAA cells (62%) and PAA-NH3 cells (71%).

Figure 3:
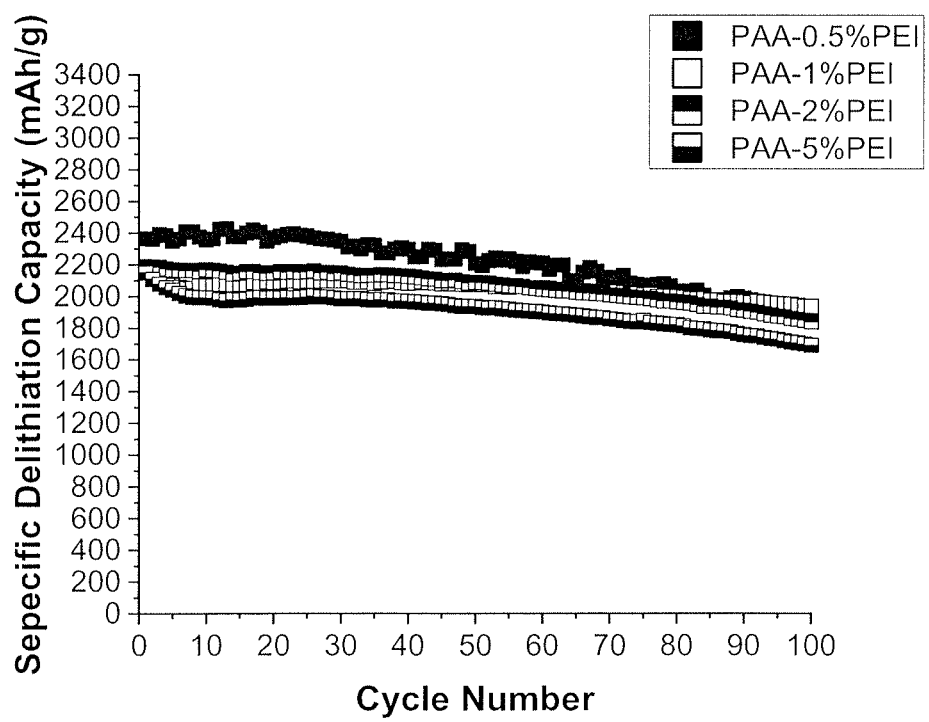
FIG. 3 provides plots of specific delithiation capacity versus cycle number for lithium half cells in 2032 coin-cell format comprising a lithium electrode and various silicon/carbon containing electrodes utilizing different compositions of a PAA/PEI binder described herein.

FIG. 3 provides plots of specific delithiation capacity versus cycle number for lithium half cells in 2032 coin-cell format comprising a lithium electrode and various silicon/carbon containing electrodes utilizing different compositions of a PAA/PEI binder described herein. Each half cell included a lithium electrode and an electrode comprising 70 wt % silicon, 20 wt % binder, and 10 wt % carbon (after drying) (See Ex. 1). The binders tested included PAA-0.5% PEI, PAA-1% PEI, PAA-2% PEI, PAA-5% PEI. The results in FIG. 3 show that the cycling performance of cells fabricated using these binders are similar. Overall PAA-1% PEI cells and PAA-2% PEI cells are slightly better than cells using the other two binder compositions.

Figure 4:
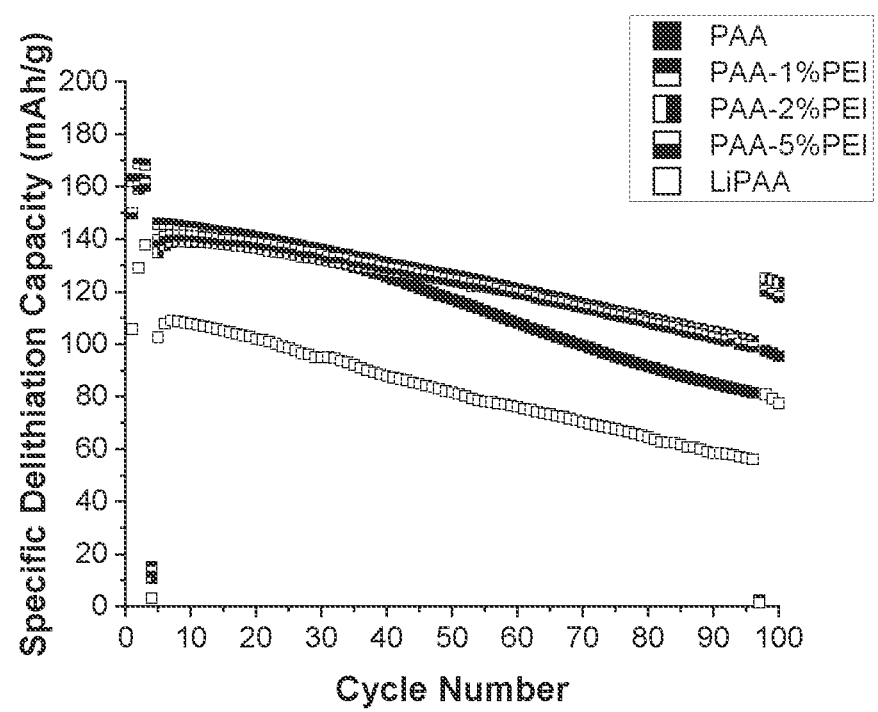
FIG. 4 provides plots of specific delithiation capacity versus cycle number for lithium full cells in 2032 coin-cell format comprising a nickel-manganese-cobalt oxide (NMC) cathode and silicon/carbon containing anodes utilizing different binder compositions.

FIG. 4 provides plots of specific delithiation capacity versus cycle number for lithium full cells in 2032 coin-cell format comprising a nickel-manganese-cobalt oxide (NMC) cathode and silicon/carbon containing anodes utilizing different binder compositions. Each full cell included a NMC 622 cathode, and an anode comprising 70 wt % silicon, 20 wt % binder, and 10 wt % carbon (after drying) (See Ex. 1). The binders tested included PAA, PAA-1% PEI, PAA-2% PEI, PAA-5% PEI, and PAA-Li binder. The results in FIG. 4 show that PAA-Li cells have the worst cycling performance with respect to initial capacity (ca. 103 mAh/g) and capacity retention (56%). PAA and the three PAA-PEI binders have similar initial capacity around 140 mAh/g. However, the capacity retention of PAA cells is only 59% while the capacity retentions of PAA-PEI cells are all above 72%. Among PAA-PEI binders, PAA-2% PEI show overall the best cycling performance with a capacity retention of 77%.

Figure 5:
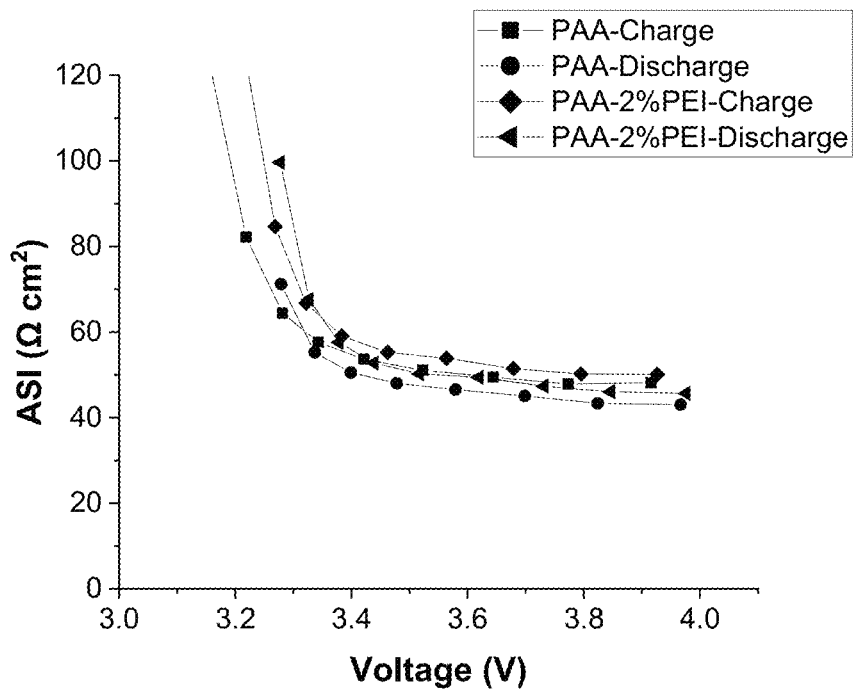
FIG. 5 provides plots of charge and discharge area-specific impedance (ASI) versus voltage before cycling for lithium full cells in 2032 coin-cell format comprising a NMC cathode and silicon/carbon containing anodes utilizing either a PAA/PEI binder as described herein or PAA binder.

FIG. 5 provides plots of charge and discharge area-specific impedance (ASI) versus voltage before aging cycling for lithium full cells in 2032 coin-cell format comprising a NMC cathode and silicon/carbon containing anodes utilizing either a PAA/PEI binder as described herein or PAA binder. Each full cell included a NMC 622 cathode, and an anode comprising 70 wt % silicon, 20 wt % binder, and 10 wt % carbon (after drying) (See Ex. 1). The binders tested included PAA and PAA-2% PEI. The results in FIG. 5 show that the charge and discharge ASI of PAA cells and PAA-2% PEI cells before aging cycling are similar.

Figure 6:
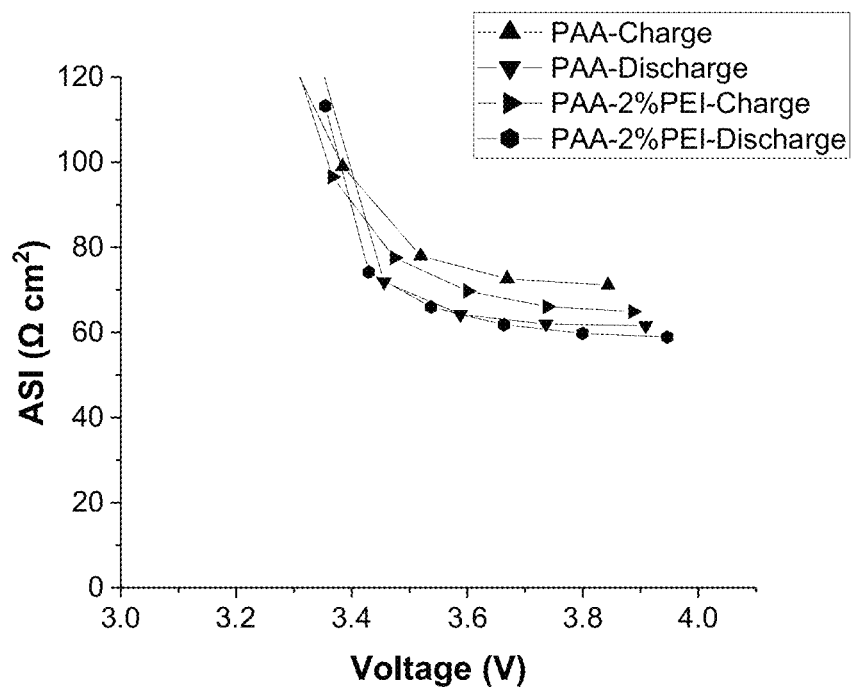
FIG. 6 provides plots of charge and discharge area-specific impedance (ASI) versus voltage after cycling for lithium full cells in 2032 coin-cell format comprising a NMC cathode and silicon/carbon containing anodes utilizing either a PAA/PEI binder as described herein or PAA binder.

FIG. 6 provides plots of charge and discharge area-specific impedance (ASI) versus voltage after aging cycling for lithium full cells in 2032 coin-cell format comprising a NMC cathode and silicon/carbon containing anodes utilizing either a PAA/PEI binder as described herein or PAA binder. Each full cell included a NMC 622 cathode, and an anode comprising 70 wt % silicon, 20 wt % binder, and 10 wt % carbon (after drying) (See Ex. 1). The binders tested included PAA and PAA-2% PEI. The results in FIG. 6 show that the discharge ASI of PAA and PAA-2% PEI cells after aging cycling are almost the same. However, the charge ASI of PAA cells after aging cycling is higher than that of PAA-2% PEI cells.

Ex. 5. Exemplary Electrochemical Cell and Battery

Figure 7:
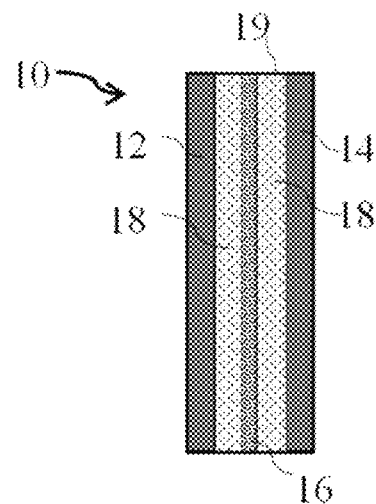
FIG. 7 schematically illustrates an electrochemical cell.
Figure 8:
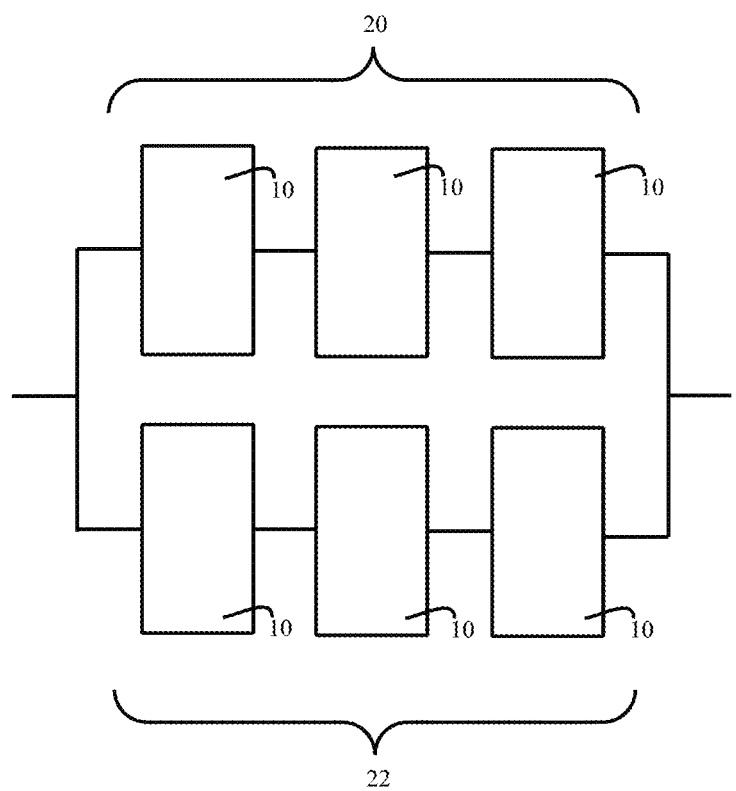
FIG. 8 schematically illustrates a battery comprising a plurality of an electrochemical cells electrically connected together.

FIG. 7 schematically illustrates a cross-sectional view of Li-ion electrochemical cell 10 comprising a first electrode 12 (e.g., comprising metallic or carbon current collector coated with a material capable of reversibly accepting and releasing lithium ions, such as an NMC compound; or comprising metallic lithium), and silicon-containing second electrode 14 as described herein, with a porous separator 16 between electrodes 12 and 14. Electrolyte 18, comprising a lithium electrolyte salt (e.g., $LiPF_6$) in a non-aqueous solvent contacts electrodes 12 and 14 and separator 16. Optionally, one or both of electrodes 12 and 14 also can include a particulate carbon material. The electrodes, separator, and electrolyte are sealed within housing 19. FIG. 8 schematically illustrates a lithium battery comprising a first array 20 consisting of three series-connected electrochemical cells 10, and a second array 22 consisting of three series-connected electrochemical cells 10, in which first array 20 is electrically connected to second array 22 in parallel.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An electrode for a lithium-ion electrochemical cell comprising silicon particles and carbon particles coated on a conductive current collector; the silicon and carbon particles being bound to each other and to the current collector by a cross-linked binder consisting of a poly(carboxylic acid) cross-linked with a branched polyethyleneimine; wherein the poly(carboxylic acid) is selected from the group consisting of poly(acrylic acid), alginic acid, carboxymethylcellulose, poly(aspartic acid), and poly(glutamic acid).

2. The electrode of claim 1, wherein the poly(carboxylic acid) is poly(acrylic acid).

3. The electrode of claim 1, wherein the poly(carboxylic acid) is crosslinked with the branched polyethyleneimine in a respective weight ratio of about 3:1 to about 20:1.

4. The electrode of claim 1, wherein the cross-linked binder is formed in situ during manufacture of the electrode by heating a mixture of the silicon particles, the carbon particles, and a binder precursor solution comprising an ammonium salt of the poly(carboxylic acid) and the branched polyethyleneimine, to thereby drive off ammonia and solvent from the binder precursor solution and form the cross-linked binder.

5. The electrode of claim 4, wherein the ammonium salt of the poly(carboxylic acid) and the branched polyethyleneimine are present in the binder precursor solution in a respective weight ratio of about 4:1 to about 25:1.

6. The electrode of claim 5, wherein the ammonium salt of the poly(carboxylic acid) is ammonium polyacrylate.

7. The electrode of claim 4, wherein the mixture of the silicon particles, the carbon particles, and the binder precursor solution is heated at a temperature in the range of about 80 to about 150° C. for about 8 to about 12 hours under vacuum.

8. The electrode of claim 1, wherein the silicon particles and the carbon particles are coated on the current collector in a respective weight ratio of about 3:1 to about 10:1.

9. The electrode of claim 8, wherein the silicon particles and the carbon particles are coated on the current collector at a loading of about 2 to about 20 grams per square meter.

10. The electrode of claim 1, wherein the current collector comprises conductive carbon or a metal selected from the group consisting of copper, nickel, copper alloy, and nickel alloy.

11. The electrode of claim 1, wherein the carbon particles comprise at least one material selected from the group consisting of graphite, carbon black, carbon nanotubes, carbon nanofibers, and graphene.

12. The electrode of claim 1, wherein the carbon particles comprise conductive carbon black.

13. A method of manufacturing a silicon-containing electrode for a lithium-ion electrochemical cell comprising:
(a) coating a slurry comprising silicon particles and carbon particles dispersed in a binder precursor solution onto a conductive current collector to form an electrode precursor; wherein the binder precursor solution consists of a solution of an ammonium salt of a poly(carboxylic acid) and a branched polyethyleneimine;
(b) heating the electrode precursor at a temperature in the range of about 80 to about 150° C. for about 8 to about 12 hours under vacuum to drive off ammonia and solvent from the binder precursor solution to thereby form a cross-linked binder in situ and to bind the silicon particles and carbon particles onto the current collector;
(c) releasing the vacuum;
(d) recovering the electrode,
wherein the poly(carboxylic acid) is selected from the group consisting of poly(acrylic acid), alginic acid, carboxymethylcellulose, poly(aspartic acid), and poly (glutamic acid); and
(e) resulting in the electrode of claim 1.

14. The method of claim 13, wherein the ammonium salt of the poly(carboxylic acid) is ammonium polyacrylate.

15. The method of claim 13, wherein the ammonium salt of the poly(carboxylic acid) and the branched polyethyleneimine are present in the binder precursor solution in a respective weight ratio of about 4:1 to about 25:1.

16. The method of claim 13, wherein the silicon particles and the carbon particles are coated on the current collector at a loading of about 2 to about 20 grams per square meter.

17. The method of claim 14, wherein the carbon particles comprise at least one material selected from the group consisting of graphite, carbon black, carbon nanotubes, carbon nanofibers, and graphene.

18. A lithium electrochemical cell comprising an anode, a cathode, a lithium ion-conducting separator between the anode and the cathode, and a lithium ion-containing electrolyte contacting the anode, the cathode, and the separator; wherein the anode is the electrode of claim 1.

19. A battery comprising a plurality of electrochemical cells of claim 18 electrically connected together in series, in parallel, or in both series and parallel.

* * * * *